B. A. LANGE.
APPARATUS FOR FORMING BOX CORNERS BY CREASING.
APPLICATION FILED NOV. 22, 1920.

1,390,795. Patented Sept. 13, 1921.
5 SHEETS—SHEET 1.

INVENTOR:
B. A. Lange
BY Hugh N. Wagner,
ATTORNEY.

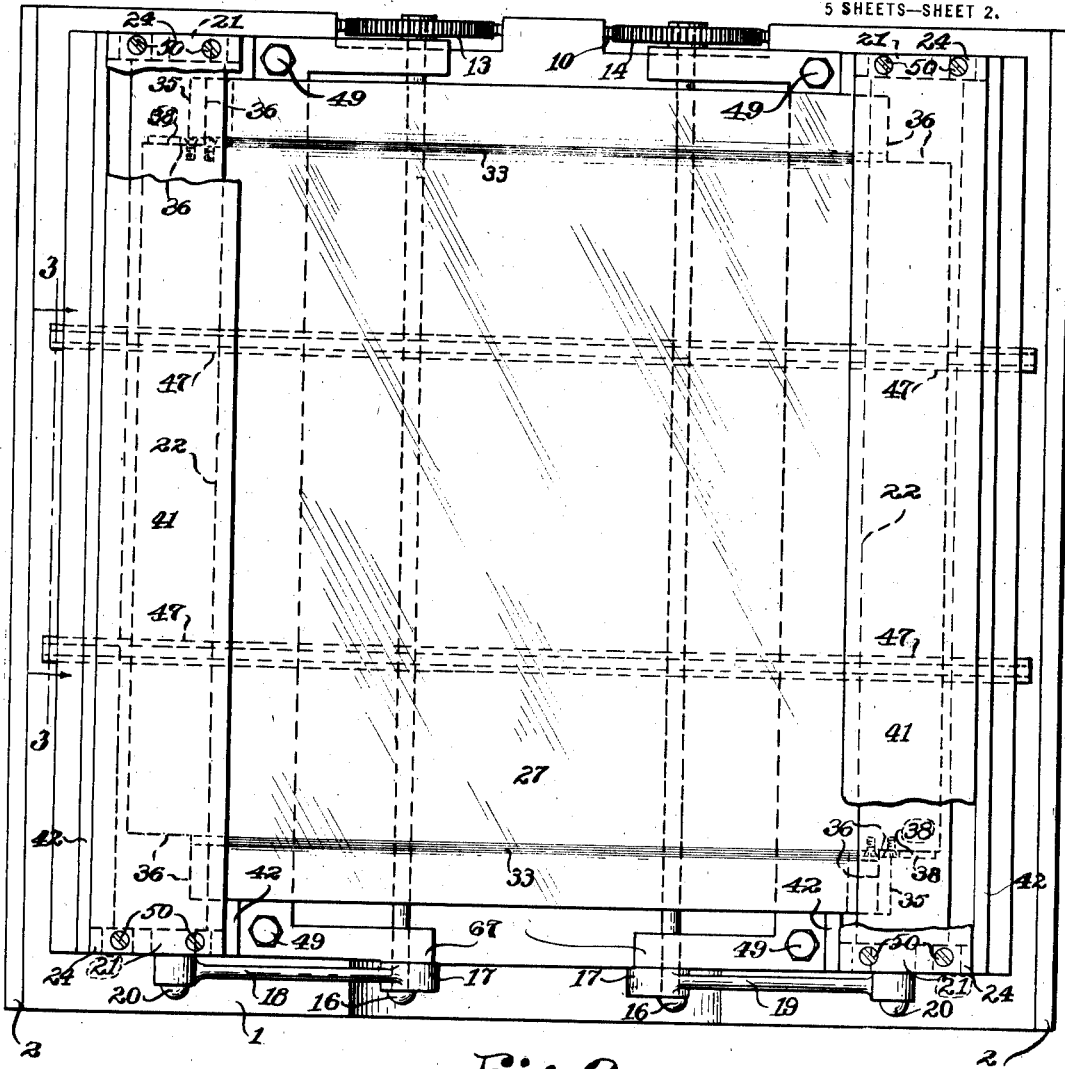
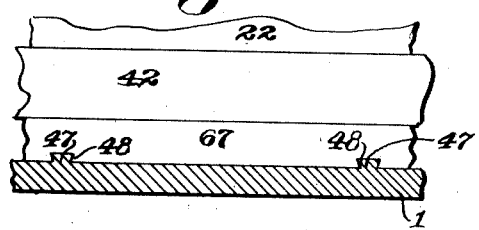

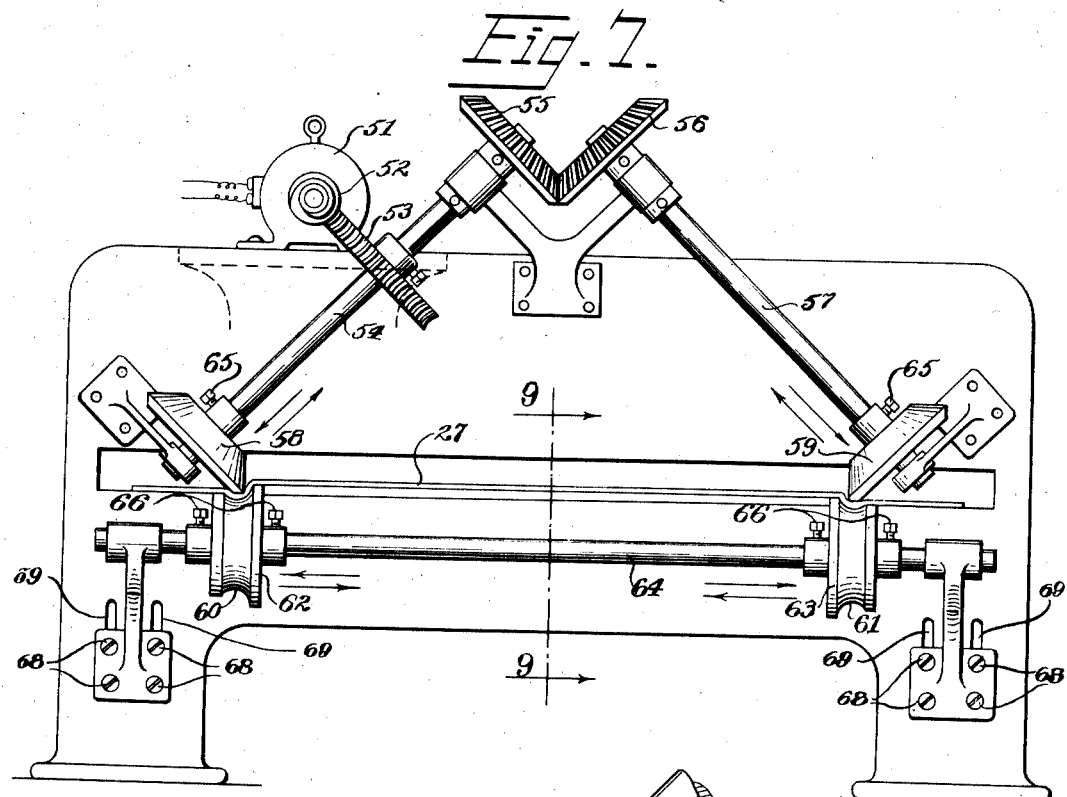
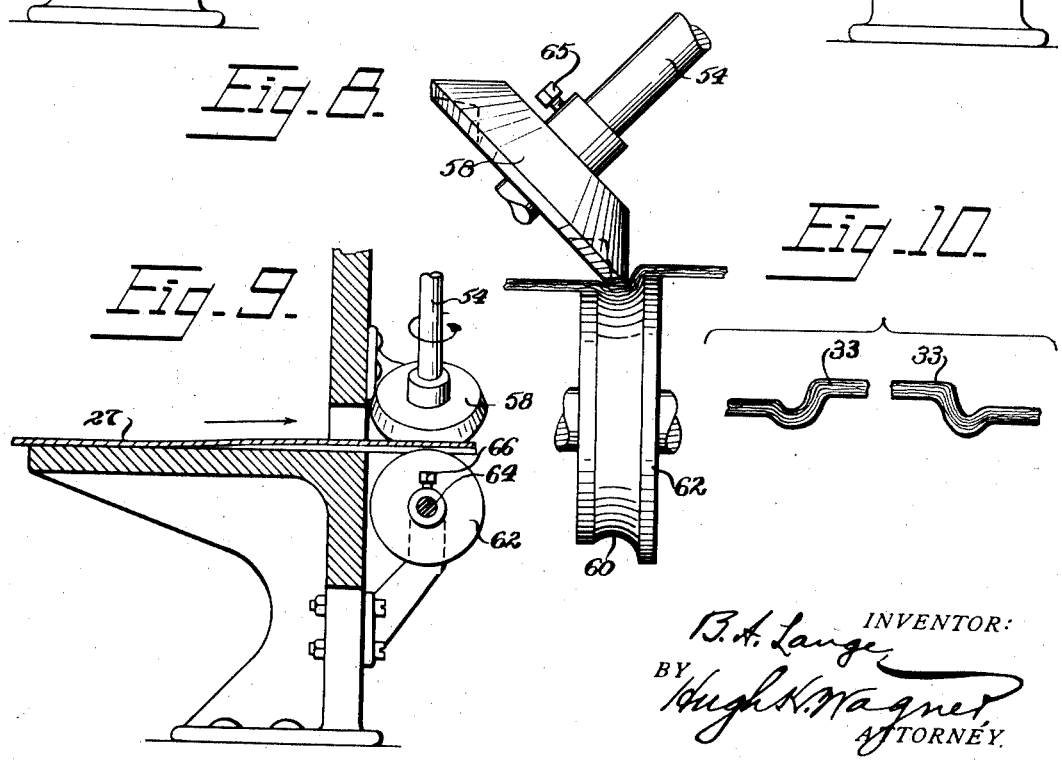

B. A. LANGE.
APPARATUS FOR FORMING BOX CORNERS BY CREASING.
APPLICATION FILED NOV. 22, 1920.

1,390,795.

Patented Sept. 13, 1921.

INVENTOR:
B. A. Lange.
BY Hugh K. Wagner,
ATTORNEY.

UNITED STATES PATENT OFFICE.

BERTHOLD A. LANGE, OF ST. LOUIS, MISSOURI.

APPARATUS FOR FORMING BOX-CORNERS BY CREASING.

1,390,795.　　　　　Specification of Letters Patent.　Patented Sept. 13, 1921.

Application filed November 22, 1920. Serial No. 425,652.

*To all whom it may concern:*

Be it known that I, BERTHOLD A. LANGE, a citizen of the United States, residing at the city of St. Louis, in the State of Missouri, have invented certain new and useful Improvements in Apparatus for Forming Box-Corners by Creasing, of which the following is a specification.

This invention is an apparatus for practising the method of forming box-joints described in the application Serial 383,740 of the same inventor and for forming the box-joint described in his application serial 400,625.

The object of this invention is to provide a cheap and speedy means of creasing the pasteboard, fiberboard, strawboard, or the like of which boxes are made at certain lines so that the corners of the box may be quickly and efficiently formed from said creases. To do this, dies are brought together by any suitable means, the material being engaged between said dies in such manner as to form the creases in the said material. Previous to this invention, it has been the practice to form these creases by two or more operations. By the use of this invention, it is possible to form any number of such creases at the same time by a continuous operation. It is, also, possible, with minor changes in the shape of the said dies, to form creases of any desired cross-section. It will be understood that the term "corners" as herein used applies to such construction whether in a vertical or horizontal plane, *i. e.*, whether along what are usually called edges or at what are usually called corners.

In addition, this invention combines with the above a device for notching the box-blank, the said notches being made at points between the "edges" and "corners."

This apparatus is so constructed as to crease the material with less straining than has been customary or with no straining at all.

In the accompanying drawings forming part of this specification, in which like numbers of reference denote like parts wherever they occur.

Fig. 2 is a top plan view;

Fig. 3 is a detail of the means for adjusting the distance between the creases;

Fig. 7 is a side elevation;

Fig. 8 is a view on an enlarged scale of the forming or creasing dies with material between them (the said dies being the ones at the left in Fig. 7);

Fig. 9 is a sectional view on line 9—9 in Fig. 7, looking in the direction indicated by the arrows;

Fig. 10 shows the creases or "corners" formed by both the righthand and lefthand dies in Fig. 7;

Figure 1:
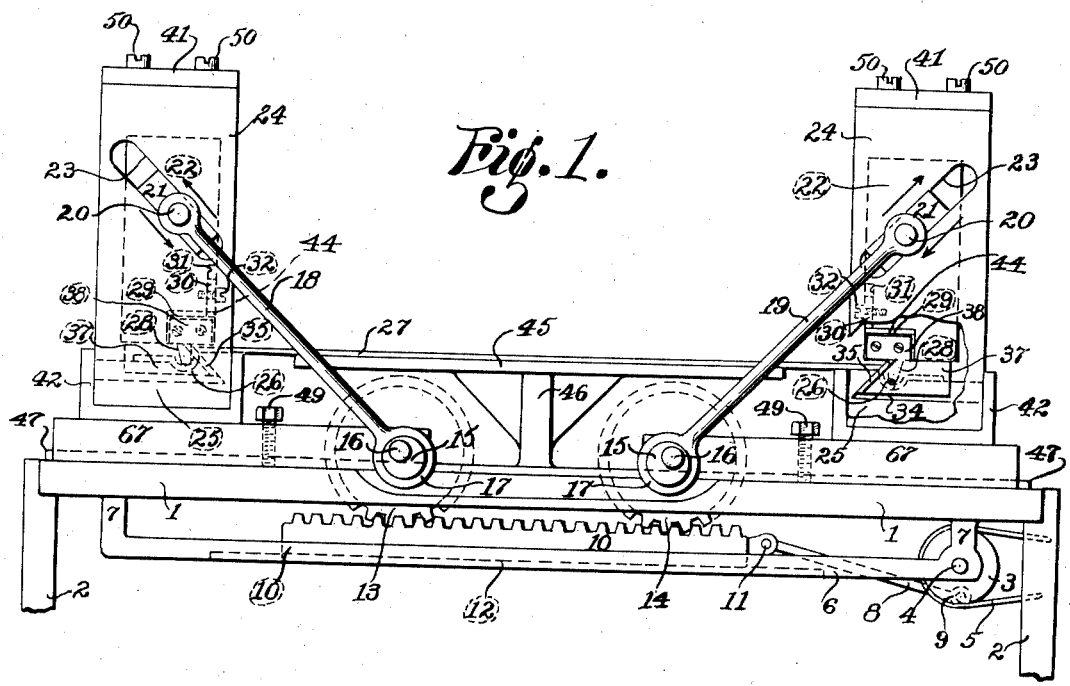
Figure 1 is an end elevation.
Figure 4:
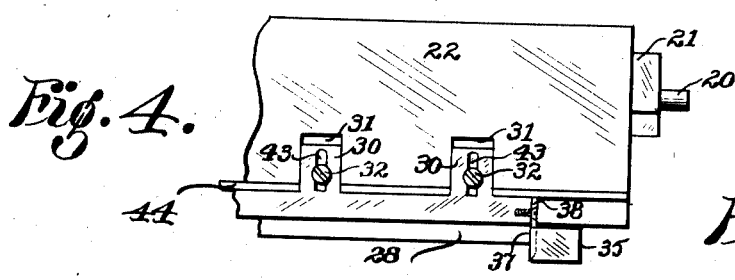
Fig. 4 is a detail of the creasing-bar and notching-knife, showing the means of adjustment.
Figure 6:
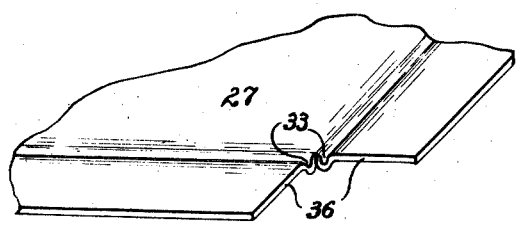
Fig. 6 is a fragmentary view of the creased material.

The table 1 is supported by standards 2. Pulley 3, mounted on shaft 4, receives power from belt 5, driven in any suitable manner. Shaft 4 is journaled in frame 6, depending by brackets 7 from table 1.

Connecting-rod 8 is eccentrically pivoted at 9 to pulley 3, and derives therefrom a back-and-forth movement that causes it to reciprocate rack 10, to which rod 8 is pivotally attached at 11. A groove or slideway 12 is provided in frame 6 for rack 10.

The longitudinal reciprocating movement of rack 10 rocks and alternately drives gears 13 and 14 in first one rotary direction and then the other. The gears 13 and 14 may be mutilated gears or may have gear teeth only at a segment of their circumference or, for purposes of adjustment, may be full gears.

Collars 15 mounted on shafts 16 provide eccentric connection by means of straps 17 for connecting-rods 18 and 19, which at their other ends are pivotally attached by studs 20 to projections 21 on creasing-block 22. Projections 21 slide in slots 23 in frame or guiding-box 24. The slots 23 serve as guideways. On the upper surface of table 1 is mounted a block or plurality of replaceable blocks 25 containing groove or channel 26.

The material 27 to be creased is fed over and past the said groove 26, and at predetermined points the creasing operation is performed by the descent of male creasing-die 28 upon the said material so as to strike it upon one of the side edges or walls of groove 26, and then with a continuous movement further to force the same down into die-groove 26 in such manner as to crease it as shown in Fig. 10 and adapt it to form box-corners that are internal to the box and minus external projections.

The male die 28 is borne by an elongated tongue 29, having lugs 30 for attaching it to weighty creasing-dieblock 22, containing recesses 31, in which the said lugs 30 seat. Screws 32 fasten lugs 30 in the said recesses 31, and by reason of this arrangement tongue 29 and with it male die 28 are adjustable relative to block 22, which adjustability permits work upon different thicknesses of material and, also, the regulation of the depth of the crease 33.

Besides the groove 26, a cutaway corner 34 is formed in each block 25, adapted to receive the cutter-blade 35 when the same descends simultaneously with the male die 28, the said die 28 to form the crease 33 and the said blade 35 to notch the box-corner 36. The blade 35 is formed integral with guide 37 and bracket 38 and is attached by screws that pass through holes 39 into holes 40 in the end of tongue 29. Thus blade 35 and die 28 move together or as one.

When rods 18 and 19 are in the position shown in Fig. 1, the die 28 has just descended with the force of the weight of block 22, and striking upon material 27 first at the edge of groove 26 has followed the same down into groove 26, as shown in Fig. 1. This sliding or slanting contact of die 28 with material 27 is due to or caused by the slanting slide of projections 21 in slots 23. The movement of rack 10 in one direction causes rods 18 and 19 to push studs 20 and projections 21 up, and the movement of rack 10 in the opposite direction causes rods 18 and 19 to pull studs 20 and projections 21 down, in which downward movement the weight of block 22 assists, besides pressing die 28 irresistibly into the material 27 with a slanting and continuous movement.

The frames or plates 24 at each end of block 22 are upheld by and fastened to plate 41, which with them makes a longitudinal U-shaped frame with the legs turned down over and at the ends of block 22, with room underneath plate 41 for the rise of block 22 to its highest position. The feet of frame members 24 rest in cradle 42, which is a longitudinal U-shaped member with the legs turned up, the side members thereof holding the end members 24 from rocking. Both the said U-shaped members extend the width of the machine.

Block 25 may be narrower than cradle 42, and then block 25 can be shifted and adjusted with die 28.

Due to the dies 28 striking toward each other, a certain suitable slippage of the material occurs, which obviates its being so taut as to snap under the blow or by stretching, as it bulges between the dies. The operation on the material is continuous, however, as the same is fed continuously, though receiving synchronous die-thrusts. The dies strike the material 27 at an oblique angle and carry the same into grooves 26, thereby creasing it, and this movement produces no strain on material 27 or, if any, only the minimum, a negligible amount, of strain.

Screws 32 pass through slots 43 in lugs 30. An adjusting and bracing shim 44 is interposed between block 22 and tongue 29, so as to prevent breakage of lugs 30.

The material 27 is supported by table 45 in its passage from one die 28 to the other. Table 45 is supported by webbed standards 46.

Any number of dies 28 desired may be utilized, from only one up to as many as can be advantageously used. They may, also, be of any suitable form. Knives for cutting the material at a suitable point after each fourth crease or corner has been formed may, also, be added (such knives, however, not being shown in the drawings), or the material may be utilized in lengths exactly suited to the size of box desired.

The table 1 is provided with rabbet-guides 47, which fit into dovetail-grooves 48 on the lower side of blocks 25, enabling blocks 25, carrying cradles 42 and therewith blocks 22, dies 28, etc., to be adjusted in any desired manner, so as to lengthen or diminish the space between the creases 33. Different gears may, also, be substituted.

Locking-bolts 49 hold blocks or carriage 67 upon table 1, and crade 42 is attached to carriage 67.

Plate 41 is attached by screws 50 to the top of frame-members 24.

In Figs. 7, 8, and 9 appears a modification of this apparatus, which modification or alternative form is adapted to form the same product by the same process, namely, that of the continuous operation on a slant by a former pressing the material to be creased into a groove.

Power may be derived from any suitable source, as, for instance, the motor 51, which drives the worm-wheel 52 and thereby the worm 53 and shaft 54. Beveled gear 55, fixed to shaft 54, drives beveled gear 56 and therewith shaft 57. Shaft 54 rotates die 58 and shaft 57 rotates die 59, thereby forcing material 27 into the grooves 60 and 61 of female dies 62 and 63, mounted on shaft 64.

Dies may be adjusted on shafts 54 and 57, set-screws 65 holding them where placed, and so may, also, dies 62 and 63, held by set-screws 66 on shaft 64, and shaft 64 may be raised or lowered by adjustment of screws 68 and in slots 69. Such adjustment may be for the accommodation of greater or less thickness of material or other purposes, such, for instance, as increasing or diminishing the distance between creases.

The dies 28 and 26 may be of different lengths and breadths, and so may, also, the tongue 29 bearing the male die 28 and the block 25 containing the female die 26. Block 25 may either extend the full width of the machine or any part thereof desired. It need not be as long as block 22 or it may be longer provided that block 22 is less in length than the distance between plates 24. It will be evident that substituting dies 28 of different thicknesses or shape will tend to change the size of creases 33 and that in some instances this will be assisted by substituting a block 25 containing a different size or shape of groove 26.

Cradle 42 is a U-shaped member running transversely of the width of the machine, with the U turned up, the legs of the U being arranged longitudinally with respect to the length of the machine, while the U-shaped member comprising the frames 24 and plate 41 is a U-shaped member with the U turned downwardly and its legs arranged laterally with respect to the length of the machine and fitting within the U formed by the cradle 42.

Figure 5:
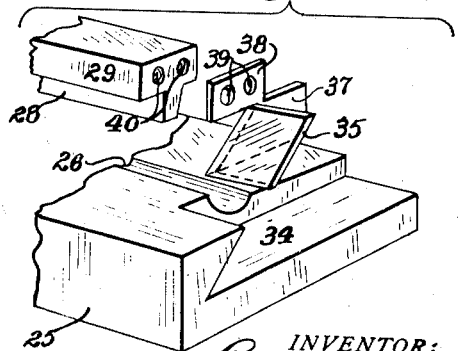
Fig. 5 is a detail of the end of the creasing-bar and notching-knife, together with the creasing-plate.
Figure 11:
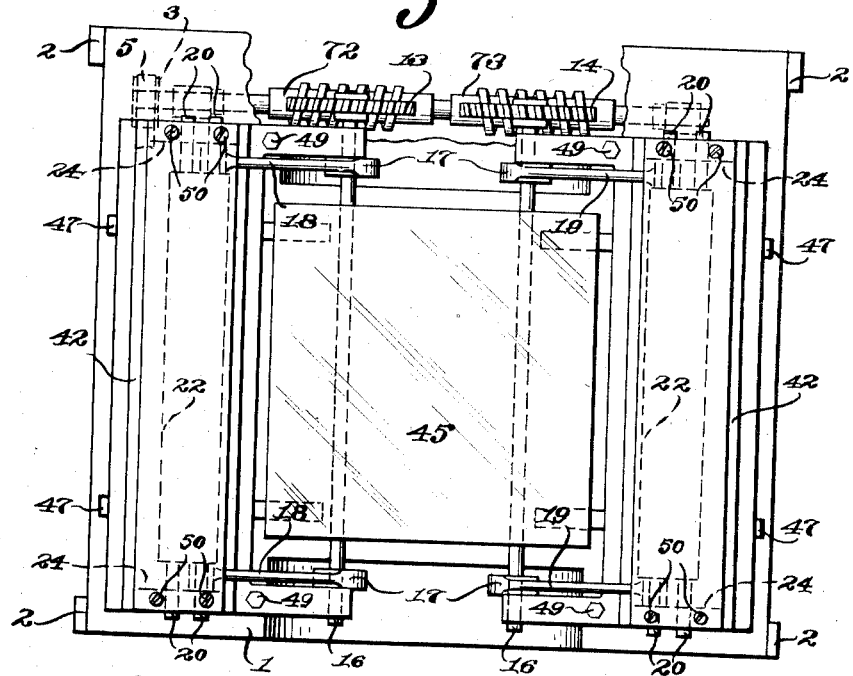
Fig. 11 is a top plan view of an alternative construction.
Figure 12:
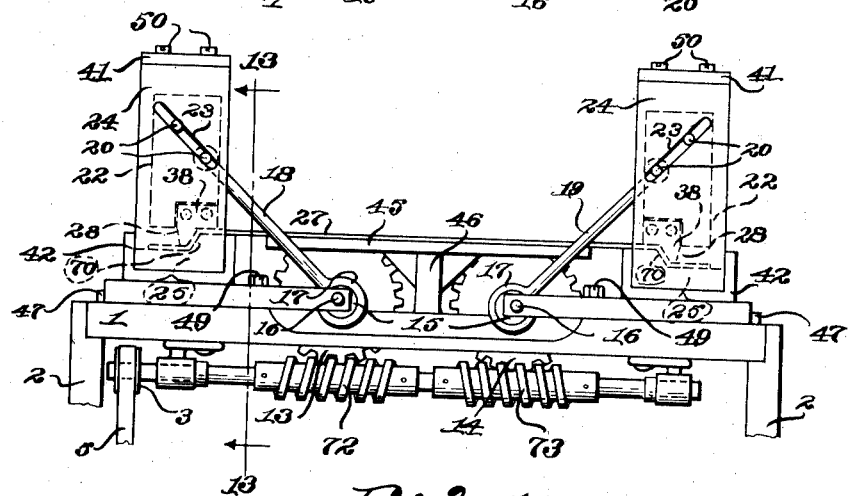
Fig. 12 is a side elevation thereof.
Figure 13:
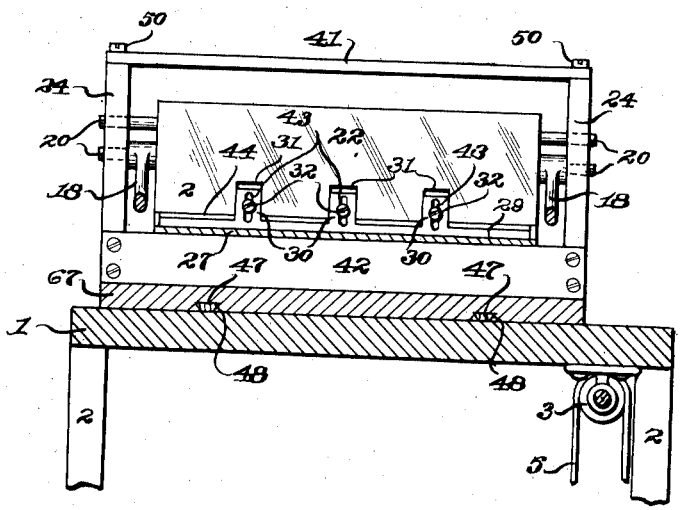
Fig. 13 is a sectional view of the same, taken on the line 13—13 in Fig. 12.
Figure 15:
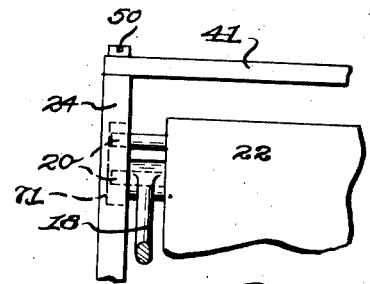
Fig. 15 is a fragmentary detail showing a modification in which a guide-groove is used in lieu of a slot.
Figure 14:
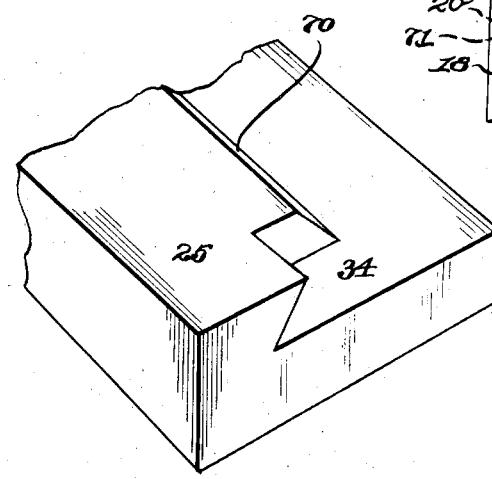
Fig. 14 is a detail showing a female die with a different form of impact surface.

Shoulder 70 in the form of die shown in Fig. 14 takes the place of groove 26 in Figs. 1 and 5 and groove 60 shown in Figs. 7 and 8, and may be used in any of the forms of machines herein illustrated as well as in the form depicted in Figs. 11, 12, and 13.

The guide-groove 71 may be used in lieu of slot 21 in either form of machine, that shown in Figs. 1 and 2 or in Figs. 11, 12, and 13.

In Fig. 11, a duplication of rods 18 and 19 is shown, and this modification may be embraced in the machine of Figs. 1 and 2, if desired. Whether or not necessary depends somewhat upon the strength of the parts but principally on the width of the machine and work to be done (calling the width of the machine from top to bottom in Fig. 2).

In Figs. 11, 12, and 13 the die 28 coacts with a slanting impact surface or shoulder 70, somewhat differing from groove 26 in Figs. 1 and 5 and groove 60 in Figs. 7 and 8.

Another slight difference between Figs. 11, 12, and 13 and Figs. 1 and 2 is that the rods 18 and 19 in Figs. 11, 12, 13 are inside the plates 24, while in Figs. 1 and 2 they are outside.

The chief modification in Figs. 11, 12, and 13 as distinguished from Figs. 1 and 2 is the utilization in Figs. 11, 12, and 13 of worms 72 and worm 73 to drive gears 13 and 14 and thereby connecting-rods 18 and 19.

This apparatus can be used to crease the corners in the solid end of a solid-end box either by running the material of which the solid end is formed through the machine first in one direction and then turning the said end material around so as to present its uncreased edges to the dies or by adapting the construction of this machine so as to have one pair of male and female dies such as herein described working at a right ang' to a similar pair of male and female dies, this construction being, however, unillus- trated in the drawings.

The product of this apparatus is characterized by the fact that the box-corner produced thereby is self contained, i. e., does not project outwardly and thereby take up space in shipping or storage, its perpendicular faces forming a neat right angle upon the outside and upon the inside, the said corner being formed along creased lines and the bracing part being formed on the inner side of the said corner from the excess pasteboard resulting from the forming of the said corner, whereby the excess material is utilized for forming the box-corner instead of forming an undesirable projection.

This apparatus is especially adapted for forming box-joints by a method of creasing pasteboard, strawboard, fiberboard, or the like, in which the said material is struck along predetermined lines, whereby part of the material is forced into a groove, so that the said material is effectually creased along the line of the said blow, the said striking die-member preferably moving in an inclined plane, and a method in which the material is creased between dies, the male die moving in a path at an inclination to the plane of the material, which is made possible by the female die being formed with a recess to permit the inclined movement of the male die.

Two parallel creases of predetermined distances apart can be made simultaneously with one operation and without changing the position of the material, and the paper moves in one direction only.

Having thus described this invention, I hereby reserve the benefit of all changes in form, arrangement, order, or use of parts, as it is evident that many minor changes may be made therein without departing from the spirt of this invention or the scope of the following claims.

I claim:

1. In a machine of the character described, the combination of a table, a carriage, guides therefor, a cradle, a block within the said cradle and bearing a female die, a vertically and slantingly movable male die having a projection, and a member adjacent to the same and containing an oblique slot in which the said projection is adapted to move.

2. In a machine of the character described, the combination of a table, a carriage, guides therefor, a cradle, a block within the said cradle and bearing a female die, a vertically and slantingly movable male die having a projection, a member adjacent to the same and containing an oblique slot in which the said projection is adapted to move, a connecting-rod, a gear connected to the said projection by the said rod, and means for rocking the said gear.

3. In a machine of the character described, the combination of a table, a carriage, guides therefor, a cradle, a block within the said cradle and bearing a female die, a vertically and slantingly movable male die having a projection, a member adjacent to the same and containing an oblique slot in which the said projection is adapted to move, a connecting-rod, a gear connected to the said projection by the said rod, and means for rocking the said gear, the said means consisting of a rack.

4. In a machine of the character described, the combination of a table, a carriage, guides therefor, a cradle, a block within the said cradle and bearing a female die, a vertically and slantingly movable male die having a projection, a member adjacent to the same and containing an oblique slot in which the said projection is adapted to move, a connecting-rod, a gear connected to the said projection by the said rod, means for rocking the said gear, the said means consisting of a rack, and a pulley and a connecting-rod pivotally attached to the said rack and eccentrically attached to the said pulley.

5. In a machine of the character described, the combination of a main frame, a track adjacent thereto, a rack adapted to be reciprocated in the said track, means for such reciprocation, a pair of gears adapted to be rocked by the reciprocation of the said rack, a pair of connecting-rods adapted to be reciprocated by the rocking of the said gears, a pair of blocks adapted to be moved by the said rods in an oblique direction alternately back and forth and each bearing a die, and a pair of stationary dies adapted to coöperate therewith.

6. In a machine of the character described, the combination of a main frame, a track adjacent thereto, a rack adapted to be reciprocated in the said track, means for such reciprocation, a pair of gears adapted to be rocked by the reciprocation of the said rack, a pair of connecting-rods adapted to be reciprocated by the rocking of the said gears, a pair of blocks adapted to be moved by the said rods in an oblique direction alternately back and forth and each bearing a die, and a pair of stationary dies adapted to coöperate therewith, there being a work-table between the said two pairs of dies adapted to support material while passing from one of the said pairs of dies to the other.

7. In a machine of the character described, the combination of a table, a carriage, guides therefor, a cradle, a block within the said cradle and bearing a female die, a vertically and slantingly movable male die having a projection, a member adjacent to the same and containing an oblique slot in which the said projection is adapted to move, and means for normally locking the said carriage.

8. In a machine of the character described, the combination of a main frame, a track adjacent thereto, a rack adapted to be reciprocated in the said track, means for such reciprocation, a pair of gears adapted to be rocked by the reciprocation of the said rack, a pair of connecting-rods adapted to be reciprocated by the rocking of the said gears, a pair of blocks adapted to be moved by the said rods in an oblique direction alternately back and forth and each bearing a die, and a pair of stationary dies adapted to coöperate therewith, the said rack and gears being at one side of the main frame and the said connecting-rods at the other.

9. The combination of a main frame, a U-shaped cradle supported thereby and extending cross-wise of the said frame, a U-shaped frame resting within the said cradle, a female die within the said cradle, and a male die movable within the said U-shaped frame.

10. The combination of a main frame, a U-shaped cradle supported thereby and extending cross-wise of the said frame, a U-shaped frame resting within the said cradle, a female die within the said cradle, and a male die movable within the said U-shaped frame, the said U-shaped members opening toward each other.

11. The combination of a main frame, a U-shaped cradle supported thereby and extending cross-wise of the said frame, a U-shaped frame resting within the said cradle, a female die within the said cradle, and a male die movable within the said U-shaped frame, the said U-shaped members opening toward each other, and the legs of one extending longitudinally and those of the other transversely with relation to the said main frame.

12. The combination of a pair of dies, one of which contains a groove having a slanting side wall and a recess and the other of which bears a notching blade adapted to coöperate with the said recess, the said blade being attached by screws to the said die.

13. The combination of a pair of dies, one of which contains a groove having a slanting side wall and a recess and the other of which bears a notching blade adapted to coöperate with the said recess, the said blade being borne by a bracket and the said bracket being struck in a different plane from the said blade and being attached by screws to the said die.

14. The combination of a pair of dies, one of which contains a groove having a slanting side wall and a recess and the other of which bears a notching blade adapted to coöperate with the said recess, the said blade being borne by a bracket and the said bracket being struck in a different plane from the said blade and being attached by screws to the said die, and the said blade and recess having oblique cutting edges.

In testimony whereof I hereunto affix my signature.

BERTHOLD A. LANGE.